US007283969B1

(12) United States Patent
Marsico et al.

(10) Patent No.: US 7,283,969 B1
(45) Date of Patent: Oct. 16, 2007

(54) METHODS AND SYSTEMS FOR AUTOMATICALLY REGISTERING COMPLAINTS AGAINST CALLING PARTIES

(75) Inventors: Peter Joseph Marsico, Carrboro, NC (US); Rick L. Allison, Holly Springs, NC (US)

(73) Assignee: Tekelec, Morrisville, NC (US)

( * ) Notice: Subject to any disclaimer, the term of this patent is extended or adjusted under 35 U.S.C. 154(b) by 1080 days.

(21) Appl. No.: 09/721,287

(22) Filed: Nov. 22, 2000

(51) Int. Cl.
*G06F 99/00* (2006.01)
*H04M 3/42* (2006.01)

(52) U.S. Cl. ................. 705/1; 379/210.02; 379/211.01

(58) Field of Classification Search .................... 705/1, 705/26, 29, 400, 500; 379/210.02, 210.03, 379/201.01, 211.01, 211.02, 212.01, 213.01, 379/196, 197, 900
See application file for complete search history.

(56) References Cited

U.S. PATENT DOCUMENTS 5,161,181 A * 11/1992 Zwick ....................... 379/88.2
5,511,111 A * 4/1996 Serbetcioglu et al. ..... 379/88.01
5,644,629 A * 7/1997 Chow .................... 379/142.07
5,668,953 A * 9/1997 Sloo ............................. 705/1
5,751,800 A * 5/1998 Ardon ........................ 379/134
5,878,338 A * 3/1999 Alperovich et al. ........ 455/417
5,895,450 A * 4/1999 Sloo .............................. 705/1
5,923,744 A * 7/1999 Cheng ................... 379/221.09
5,926,534 A 7/1999 Correia, II
5,930,698 A * 7/1999 Bertacchi .................... 455/405
5,991,367 A * 11/1999 Robuck ................... 379/88.24
6,014,435 A * 1/2000 Rosen ........................ 379/200
6,067,355 A 5/2000 Lim et al.
6,233,313 B1 * 5/2001 Farris et al. ........... 379/112.01
6,330,317 B1 * 12/2001 Garfinkel .................... 379/196
6,385,310 B1 5/2002 Holiday, II
6,418,215 B1 * 7/2002 Schessel ................ 379/207.02
6,449,474 B1 * 9/2002 Mukherjee et al. ...... 455/414.2
6,519,332 B1 * 2/2003 Tovander .................... 379/196
6,574,614 B1 * 6/2003 Kesel .......................... 706/52
6,584,185 B1 * 6/2003 Nixon ................... 379/201.01
6,650,633 B1 * 11/2003 Albers et al. ............... 370/352
6,650,901 B1 * 11/2003 Schuster et al. .............. 379/45

(Continued)

FOREIGN PATENT DOCUMENTS

EP 0 813 162 12/1997

(Continued)

OTHER PUBLICATIONS

Official Action in EP Application No. 01 988 157.2—2414 (Mar. 16, 2004).

(Continued)

*Primary Examiner*—Igor N. Borissov
(74) *Attorney, Agent, or Firm*—Jenkins, Wilson, Taylor & Hunt, P.A.

(57) ABSTRACT

Disclosed is a communication system that is adapted to notify a calling party that no further call attempts should be made and to automatically register a complaint with a calling party complaint registration database. The calling party complaint database is further adapted to notify an enforcement authority of repeated violations by a calling party. The called party communication terminal is adapted to automatically block subsequent call or communication attempts from a repeat offending calling party while simultaneously sending an additional complaint registration to the calling party complaint registration database.

36 Claims, 13 Drawing Sheets

U.S. PATENT DOCUMENTS

| | | | | |
|---|---|---|---|---|
| 6,654,452 | B1 * | 11/2003 | Murray et al. | 379/197 |
| 6,668,175 | B1 * | 12/2003 | Almgren et al. | 455/522 |
| 6,701,160 | B1 * | 3/2004 | Pinder et al. | 455/550.1 |

FOREIGN PATENT DOCUMENTS

| | | | |
|---|---|---|---|
| WO | WO 9626496 | * | 8/1996 |
| WO | 99/29099 | | 6/1999 |
| WO | 99/37066 | | 7/1999 |

OTHER PUBLICATIONS

International Search Report in PCT Application No. 01/43425 (Feb. 24, 2003).

“Adcomplain—A Tool for Reporting Inappropriate Postings/E-Mails,” http://www.rdrop.com/users/billmc, pp. 1-80 (May 5, 1999).

* cited by examiner

SIP INVITE Message Diagram

260

| Local Blocking Table | |
|---|---|
| **KEY** | **DATA** |
| Calling Party ID (262) | Block (264) |
| 9194605500 | Yes |
| a.g.bell@bell-telephone.com | No |
| 9194604324 | No |
| www.adtime.net | No |
| hwillis@aol.com | No |

Figure 6

Violation Message Diagram

400

Complaint Table

| KEY(s) | | | DATA | |
|---|---|---|---|---|
| Offending Party ID (402) | Complaining Party ID (404) | Call-ID | Complaint No. (406) | EA ID (408) |
| 9194605500 | 9194623356 | 187602141351@rdu.bell-telephone.com | 1 | NC |
| a.g.bell@bell-telephone.com | watson@bell-telephone.com | 134602131341@sf.bell-telephone.com | 2 | CA |
| 9194604324 | klidder@aol.com | 567602456552@bhm.bell-telephone.com | 1 | AL |
| www.adtime.net | pjones@aol.com | 786542141786@nfk.bell-telephone.com | 4 | VA |
| hwillis@aol.com | 9194607858 | 234602146567@rdu.bell-telephone.com | 1 | NC |

410

382

Enforcement Table (420)

| KEY | DATA |
|---|---|
| EA ID (422) | Enforcement Agency Contact (424) |
| NC | agius@mail.ius.state.nc.us |
| CA | agius@mail.ius.state.ca.us |
| AL | agius@mail.ius.state.al.us |
| VA | agius@mail.ius.state.va.us |

Figure 10

METHODS AND SYSTEMS FOR AUTOMATICALLY REGISTERING COMPLAINTS AGAINST CALLING PARTIES

TECHNICAL FIELD

The present invention relates to methods and systems for automatically registering complaints against calling parties. More particularly, the present invention relates to methods and systems for automatically generating a complaint registration message in response to receiving a message pertaining to a call from a party with whom communication is not desired.

BACKGROUND ART

Within the current public switched telephone network (PSTN), signaling is accomplished via the use of signaling system 7 (SS7) messages such as those shown in FIG. 1. The simplified SS7 network 100 presented in FIG. 1 includes a calling party 102 and a called party 104 that are generally connected via end offices or service switching points (SSPs) 106 and 108 and an SS7 signaling network 110. As such, SS7 signaling messages may be communicated between the SSP nodes 106 and 108 via signaling network 110. Those skilled in the art of telecommunication network signaling communications will appreciate that a variety of SS7 messages may be employed to facilitate the setup and teardown of voice calls. Furthermore, certain types of SS7 messages may be used to access network communication service applications that provide such services as caller ID, 800 number service, etc. A detailed discussion of SS7 signaling message types and their associated function can be found in Signaling System #7 by Travis Russell, McGraw-Hill Publishing 1998.

As indicated in FIG. 1, an SS7 ISDN user part (ISUP) message may be launched by SSP 106 in response to a call attempt by calling party 102. An SS7 transaction capabilities application part (TCAP) message requesting routing information associated with the call may also be generated by SSP 106 during the call setup sequence. It should be noted that in the PSTN network, SS7 signaling messages are not directly sent to or received by the calling or called parties. Instead, such call signaling messages are generated by an SSP or other SS7 signaling points (SP) in response to a call attempt.

However, in an Internet protocol (IP) telephony type communication network such as IP telephony network 150 shown in FIG. 2, call signaling messages may be generated directly by a calling or called party's communication terminal. As indicated in FIG. 2, the simplified IP telephony network 150 includes a calling party 112 and a called party 114 that are generally connected via a pair of session initiation protocol (SIP) proxy servers 116 and 118, and an IP network 120. Again, it will be appreciated that communication network 150 is a greatly simplified example of an IP telephony network architecture, and that numerous other routing and processing nodes may also be employed to provide complete communication network service and functionality. For the purposes of example, it will be appreciated that in such an IP network scenario, SIP signaling messages may be communicated directly between the calling and called parties 112 and 114, respectively. That is, the communication terminals (telephone handset, computer, personal digital assistant (PDA), etc.) associated with calling party 112 and called party 114 are adapted to receive, process, and send SIP type signaling messages.

For instance, one example of a SIP type signaling message that could be generated and sent by calling party 112 is a SIP Invite message 200, presented in FIG. 3. SIP Invite message 200 includes a header field 202, a Via field 204, a From field 206, a To field 208, a Call-ID field 210, a Content-Type field 212, a Content-Length field 214, and a Payload field 216. Such SIP type messages are employed in a SIP-based IP telephony network to facilitate the setup and execution of a communication session comparable to a telephone call in a conventional PSTN type communication network.

With particular regard to features and services provided by the PSTN, it is well known to block incoming telephone calls based on the calling party's telephone number. Such call blocking service is popular, as it prevents parties associated with certain numbers from being allowed to "ring" a communication service subscriber's phone. Obvious uses for such a service include the prevention of obscene, harassing, and/or annoying phone calls. In particular, such call blocking features are commonly used by telephone subscribers to prevent unsolicited calls from telemarketing organizations.

With regard to telemarketing calls, it will appreciated that this category of calls has become so bothersome that laws have been passed in many states that forbid telemarketing firms from repeatedly calling a telephone subscriber once the subscriber has formally notified the telemarketing firm that the subscriber does not wish to receive any further solicitations. Although such laws exist and are in place, most subscribers do not know which agency in their government that they should notify in the event of repeated violations of the law by a telemarketing firm. Furthermore, there is no easy, consistent method of documenting violations of the law.

With the advent of IP telephony networks, such as network 150 shown in FIG. 2, the control of call or communication session signaling has essentially been moved closer to the calling and called parties. As such, intelligent SIP communication terminals may generate, send, receive, and process signaling messages directly, thereby providing a platform for user-directed processing of signaling messages. Furthermore, IP-enabled communication terminals may be adapted to directly access a wide area communication network such as the Internet or World Wide Web. Consequently, some IP-enabled communication terminals may have simultaneous access to both voice and data network components and services. Thus, a call or communication attempt can assume the form of a voice type call or a non-voice type communication (e.g., e-mail, short text message, short audio message, etc.).

Therefore, what is needed is a system for and method of blocking a call or communication attempt from a calling party, automatically registering a complaint against the calling party, and subsequently notifying the appropriate enforcement authority of violations of applicable laws, utilizing the signaling capabilities of IP-enabled communication terminals.

DISCLOSURE OF THE INVENTION

According to one aspect, the present invention includes a communication system for receiving a call attempt from a calling party, identifying the calling party as a calling party with whom communication is not desired, notifying the calling party that no additional call attempts should be made, and automatically registering a complaint with a centralized calling party complaint database. The calling party complaint database may notify an enforcement authority of repeated violations by a calling party and automatically block such repeated call attempts.

The present invention includes a communication terminal, such as a telephone, a mobile phone, a personal digital assistant (PDA), or a computer for receiving a call signaling message (e.g., a call setup/teardown message, caller ID message, etc.) and subsequently generating a notification datagram or message for transmission through a data network (e.g., the Internet or WWW). As such, a communication terminal of the present invention is capable of identifying a calling party from signaling information contained within a communication or call setup type signaling message that is received by the terminal. The communication terminal plays a pre-recorded announcement to the calling party notifying the calling party that further calls are not permitted, and subsequently sends a notification message to a calling party complaint registration database. The notification or complaint registration message includes the calling party identification information that was obtained from a communication or call signaling message. Following the initial complaint registration, subsequent complaint registration notifications associated with a repeat offense by a calling party will cause the complaint registration database to send a violation notification message to an enforcement authority, thereby notifying the enforcement authority of the calling party's repeat offense. With particular regard to the subsequent complaint scenario, the complaint registration system of the present invention is adapted to automatically refuse or block a call or connection attempt by a calling party who is a repeat offender.

The functions for automatically registering complaints against a calling party are described herein as modules or processes. It is understood that these modules or processes may be implemented as computer-executable instructions embodied in a computer-readable medium. Alternatively, the modules or processes described herein may be implemented entirely in hardware. In yet another alternative embodiment, the modules or processes described herein may be implemented as a combination of hardware and software.

Accordingly, it is an object of the present invention to provide a communication system for notifying a calling party that no further calls are desired.

It is another object of the present invention to provide a system and method for simultaneously notifying a calling party that no further calls are desired, and sending a complaint registration message associated with the calling party to a complaint registration database.

It is another object of the present invention to provide a system and method for notifying a complaint enforcement authority in response to a called party receiving a call from a calling party after a complaint against the calling party has already been registered at a complaint registration database.

It is another object of the present invention to provide a complaint registration database application for automatically notifying a complaint enforcement authority in response to a called party receiving a call from a calling party after a complaint against the calling party has already been registered at the complaint registration database.

It is another object of the present invention to provide a system and method for automatically blocking call attempts made by a repeat offending calling party.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 6 is a diagram that illustrates an exemplary local blocking table structure that may be stored in a communication terminal according to an embodiment of the present invention.

FIG. 10 is a diagram that illustrates an exemplary complaint registration database structure according to an embodiment of the present invention.

DETAILED DESCRIPTION OF THE INVENTION

Figure 4:
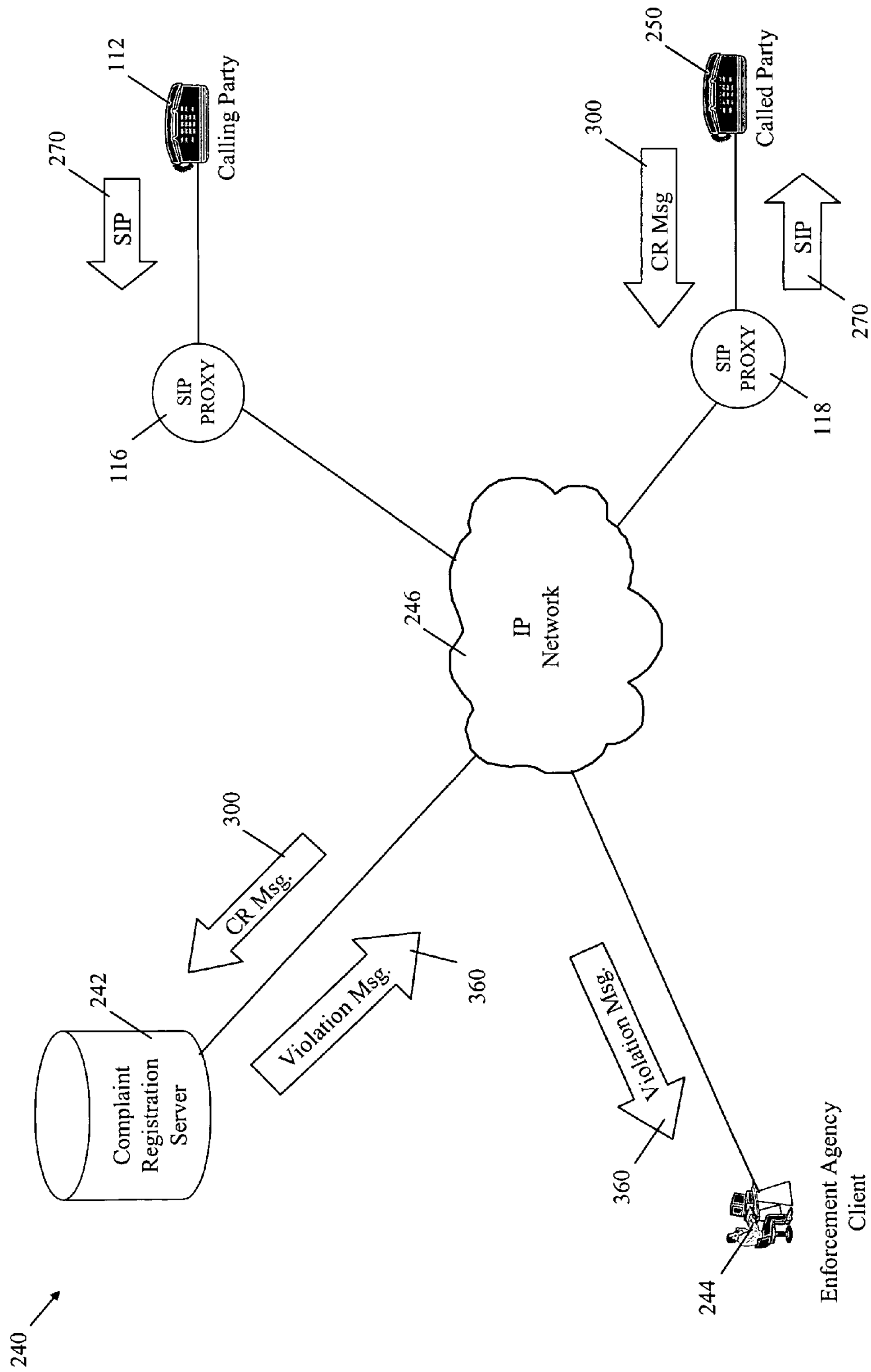
FIG. 4 is a network diagram illustrating complaint and violation message flow pathways through an IP communication network according to an embodiment of the present invention.

Disclosed herein are several embodiments of the present invention that relate to a general technique for enabling a called party to register a complaint against a calling party, and subsequently block call attempts from the calling party. FIG. 4 is a network diagram that illustrates the core functionality of one embodiment of the present invention. More particularly, FIG. 4 includes a simplified communication network 240 that is comprised of a complaint registration server 242, an enforcement agency client 244, an Internet protocol (IP) network 246, a calling party communication terminal 112, and a called party communication terminal 250. Calling party communication terminal 112 is connected to a session initiation protocol (SIP) proxy server node 116, while called party communication terminal 250 is connected to SIP proxy server node 118. In the example presented in FIG. 4, all of the network elements are adapted to communicate with one another either directly or indirectly via the IP network 246. For the purposes of illustration, SIP-based messages are used throughout this disclosure. However, it should be appreciated that other equivalent messaging protocols could also be employed to achieve the functionality of the intelligent communication blocking and complaint registration system of the present invention.

Calling party terminal 112 is adapted to generate and transmit a SIP message in response to a call attempt by a calling party. Again, it will be appreciated that calling party terminal 112 may be a wired telephone, a wireless telephone, a computer, or other functionally similar communication device. SIP proxy server 116 is adapted to receive and route SIP messages to and from calling party 112 via the IP network 246. In a similar manner, SIP proxy server 118 facilitates the routing and communication of SIP messages to and from called party 250 via IP network 246. Complaint registration server 242 is adapted to process complaint registration messages 300 received via IP network 246 and also to transmit violation messages 360 via IP network 246. Enforcement agency client 244 is adapted to process violation messages 360 received via IP network 246.

Figure 1:
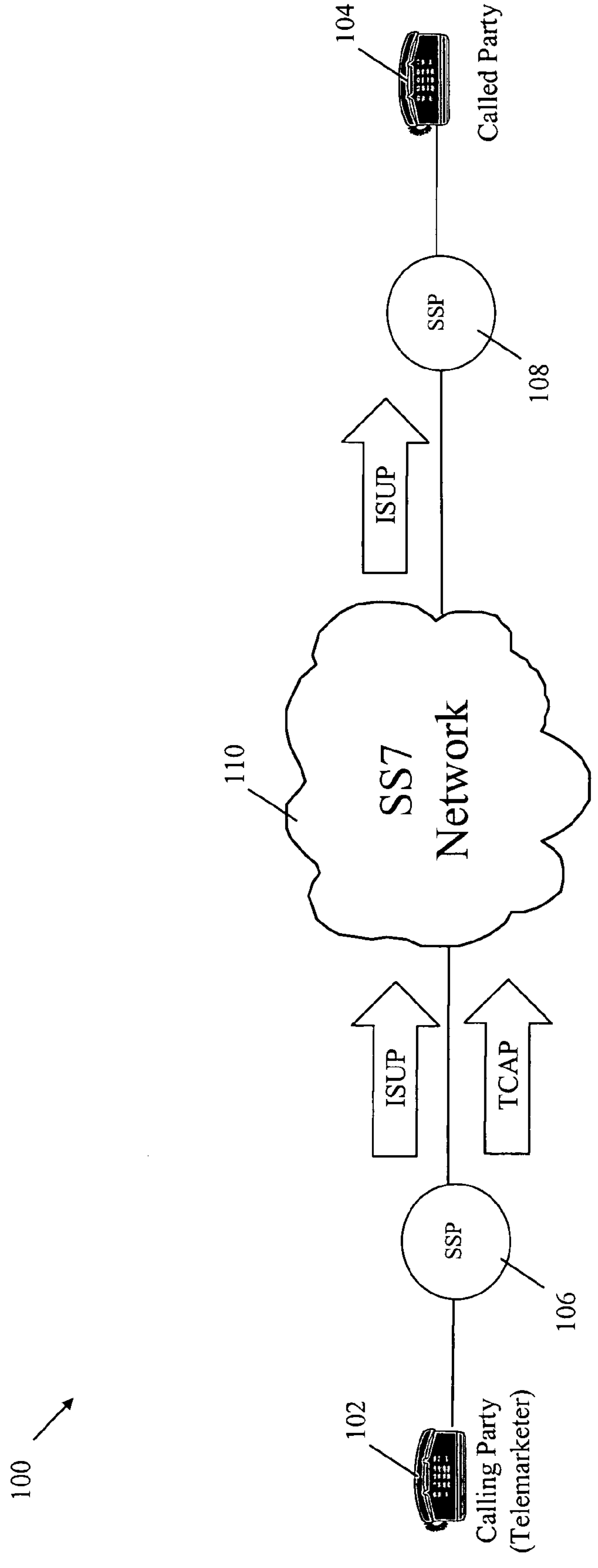
FIG. 1 is a network diagram illustrating a conventional SS7 call signaling network.
Figure 2:
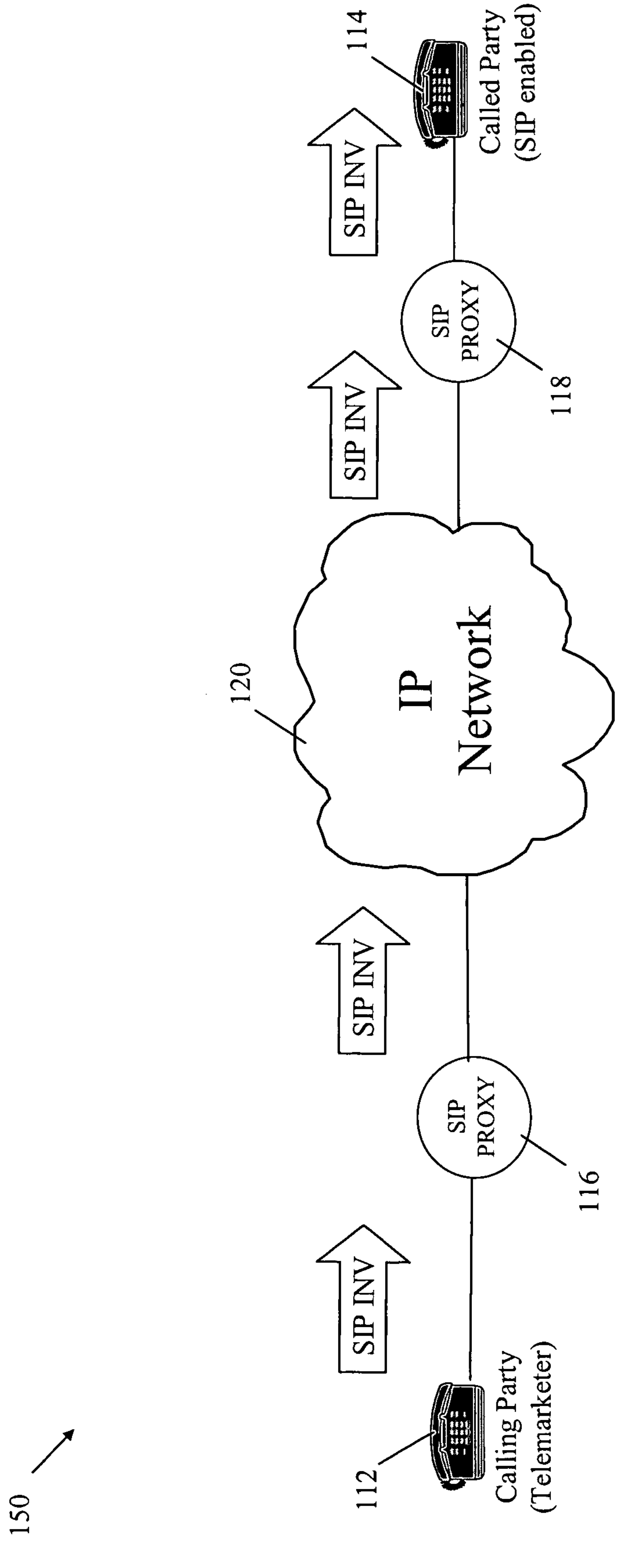
FIG. 2 is a network diagram illustrating a conventional Internet protocol (IP) communication network that includes IP-capable communication terminals.
Figure 3:
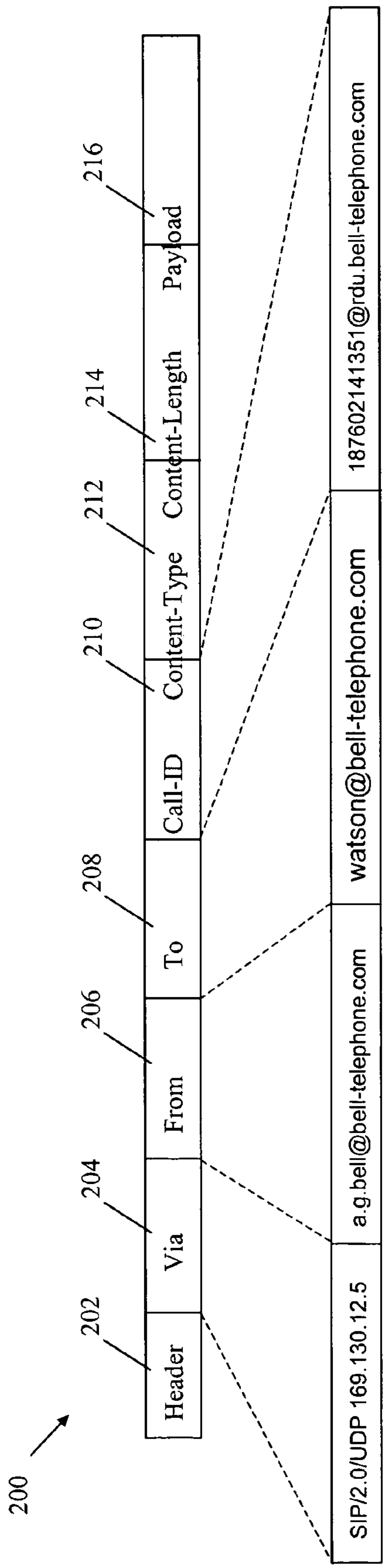
FIG. 3 illustrates a conventional session initiation protocol (SIP) Invite message structure.
Figure 5:
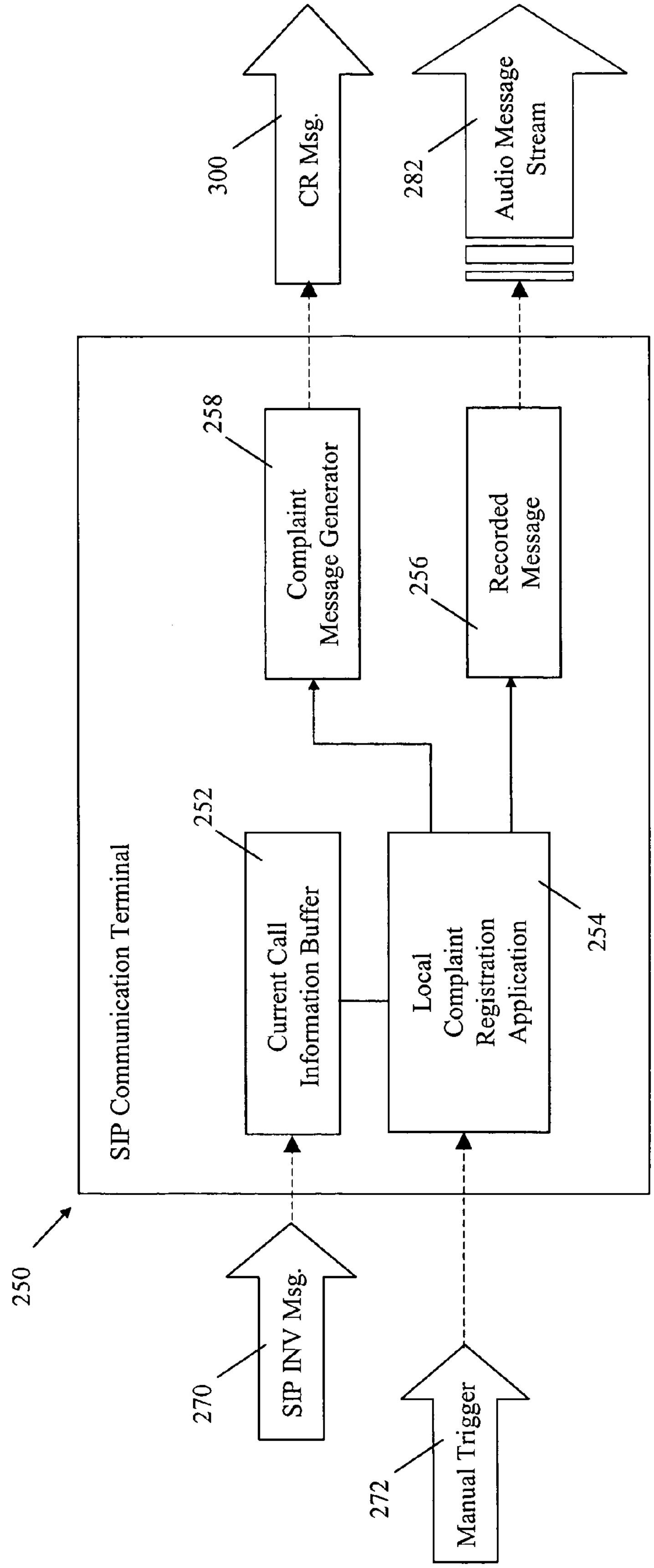
FIG. 5 is a schematic diagram illustrating an exemplary SIP-based communication terminal architecture including complaint message generation capabilities according to an embodiment of the present invention.

With particular regard to the called party communication terminal 250, a more detailed diagram of one embodiment of the terminal is provided in FIG. 5. Referring to FIG. 5, SIP-enabled communication terminal 250 includes a current call information buffer 252, a complaint registration application 254, a recorded message buffer 256, and a complaint message generator 258. Current call information buffer 252 is adapted to examine an incoming SIP message, such as SIP Invite message 270. Buffer 252 extracts and temporarily stores relevant information associated with incoming call or communication request. In the one case, relevant information may include information related to the identity of the calling party, such as the "From" field 206 or the "Call-ID" field 210 shown in the SIP message structure presented in FIG. 3. Buffer 252 is also adapted to communicate some or all of such relevant information to the local complaint registration application 254, where this information may be retained and stored.

The local complaint registration application 254 is a software or firmware process that runs within the communication terminal 250 which is adapted to perform a number of operations related to the call blocking and complaint registration functionality of the present invention. More particularly, complaint registration application 254 is adapted to receive a manual trigger 272 initiated by a called party in response to the receipt of an unwanted call or communication. In one embodiment, the manual trigger could be generated by the pressing of a pre-programmed button on the communication terminal. In the event of a personal computer based communication terminal, the manual trigger could be generated by the clicking of screen icon by a mouse or other such pointing device. Complaint registration application 254 is also adapted to perform certain functions without the need for an explicit manual trigger. More particularly, if a call or communication setup message is received from a calling party who has been previously notified by called party communication terminal 250 that no further calls or communications are desired, then complaint registration application 254 is adapted to automatically refuse the call or communication attempt. Such automatic call blocking functionality is accomplished in one embodiment through the use of a blocking table or database that is maintained and accessed by the complaint registration application 254. As illustrated in FIG. 6, such a blocking table 260 may include a calling party identifier 262 and flag 264 that indicates whether the calling party has previously had a complaint registration message launched from the terminal. As such, calling party information associated with an incoming signaling message can be compared with the contents of the "local" blocking table 260 to determine whether blocking is required.

Referring back to FIG. 5, recorded message buffer 256 is a software or firmware process that is adapted to play a pre-recorded announcement 282 to the calling party associated with SIP Invite message 270 notifying the calling party that a complaint has been registered and that no further communication attempts should be made. The pre-recorded announcement may be an audio message or a text message depending upon the context of the attempted communication. For example, if a voice type communication attempt was being attempted by an offending calling party, an audio message could be played. If the offending calling party was attempting to send a text type short message or e-mail, a text announcement or notification message could be sent to the calling party in response. Such notification announcements could be played or sent each time a manual trigger is initiated. In the case of repeat offenders, an alternate pre-recorded announcement could be automatically played (i.e., without requiring a manual trigger) which informs the offending calling party that a violation message has been sent to an enforcement agency.

Complaint message generator 258 is adapted to create and transmit a complaint registration (CR) message 300 in response to an appropriate instruction from the complaint registration application 254. In the example implementation described herein, it is assumed that the CR message utilizes SIP protocol. However, a SIP-formatted CR message is not essential to the operation of the present invention, and any number of different application protocols could be employed to carry the CR "payload."

Figure 7:
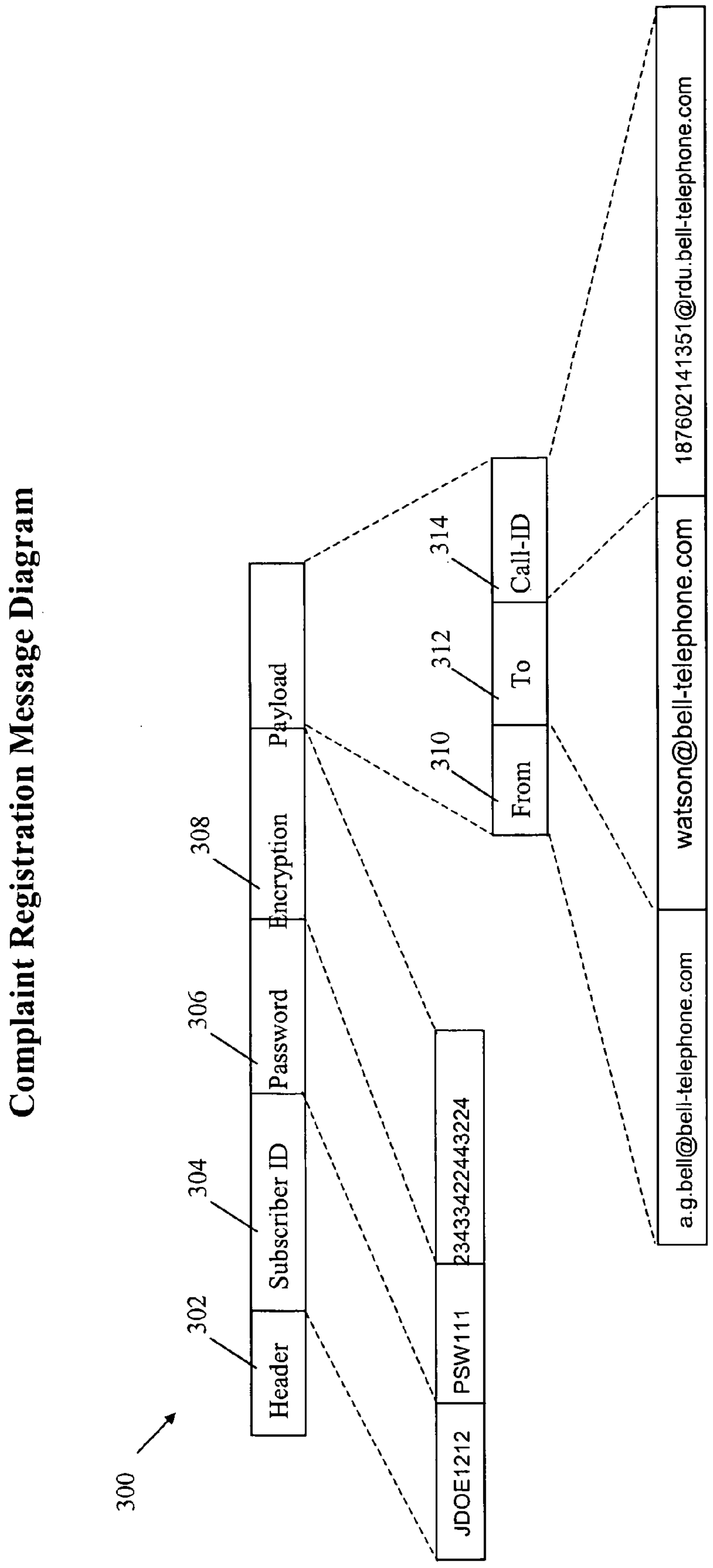
FIG. 7 is a diagram that illustrates an exemplary complaint registration message structure according to an embodiment of the present invention.

Shown in FIG. 7 is a sample CR message structure and associated sample content. Sample CR message 300 includes a message header component 302, which, for the purposes of a SIP example, can include any required SIP header/packet information. CR message 300 also includes a subscriber ID field 304, a password field 306, an encryption field 308, and a CR payload field. CR payload field further includes a "From" field 310, a "To" field 312, and a "Call-ID" field 314. Again, it will be appreciated that the information contained in the CR payload field is relevant to determining and/or verifying the identity of the offending calling party. Other, functionally equivalent CR message structures could easily be employed using a variety of application protocols to satisfy the desired objective of complaint registration without departing from the scope of the invention.

Figure 8:
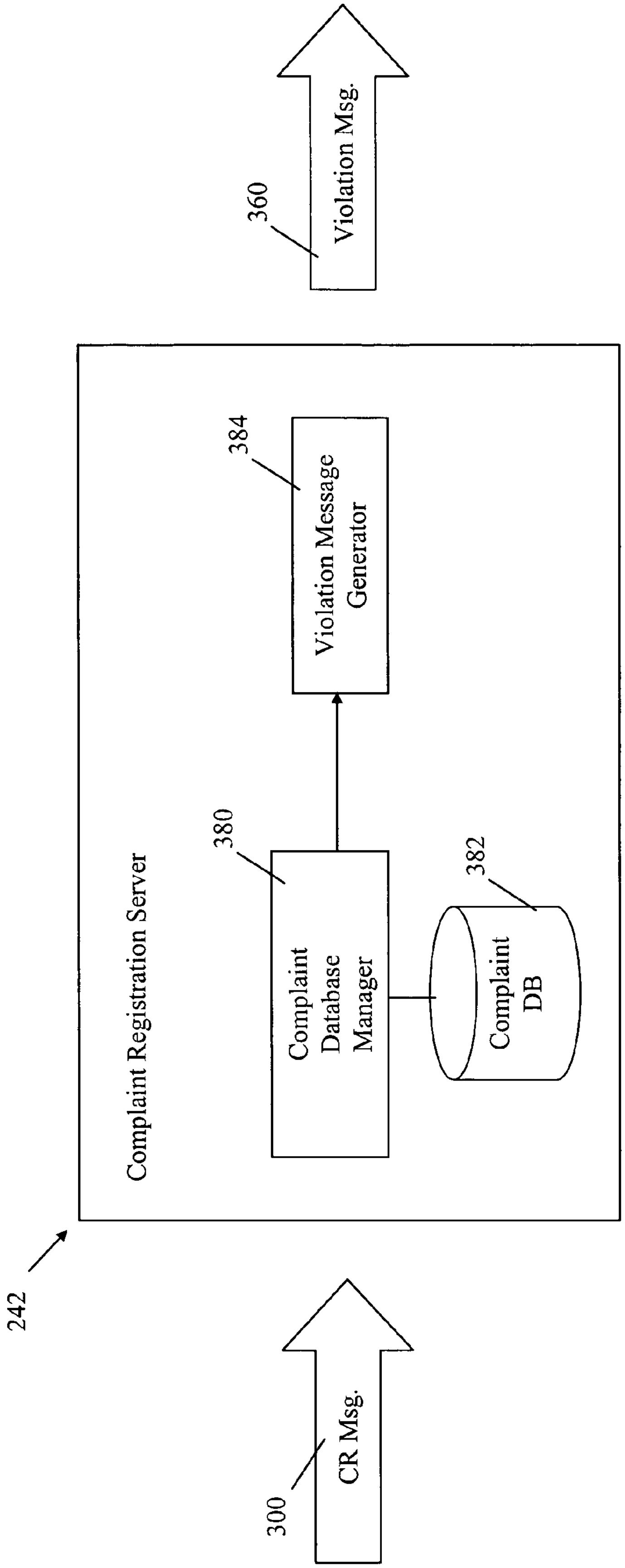
FIG. 8 is a block diagram that illustrates a complaint registration server according to an embodiment of the present invention.

With regard to the complaint registration server 242 shown in FIG. 8, it will be appreciated that this server and associated applications are adapted to receive, process, and store complaint registration (CR) messages. One component of CR message processing includes generating a violation message in response to determining that a received CR message represents a repeat offense by a calling party. Complaint registration server 242 achieves this functionality by receiving, storing and analyzing CR messages received from a subscriber. In one embodiment, complaint registration server 242 is adapted to receive and processes CR messages from a plurality of subscribers, thereby acting as a centralized, controlled repository of calling party complaint information.

In the embodiment illustrated in FIG. 8, complaint registration server 242 is comprised of a complaint database manager process 380, a complaint database 382, and a violation message generator 384. Complaint database manager process 380 is adapted to receive a CR message 300, extract information related to an offending call and subsequently perform a search or lookup operation in the associated complaint database 382 using this information. Complaint database manager process 380 is further adapted to initiate the generation of a violation message 360 via violation message generator 384 in the event that a repeat offense is indicated.

Figure 9:
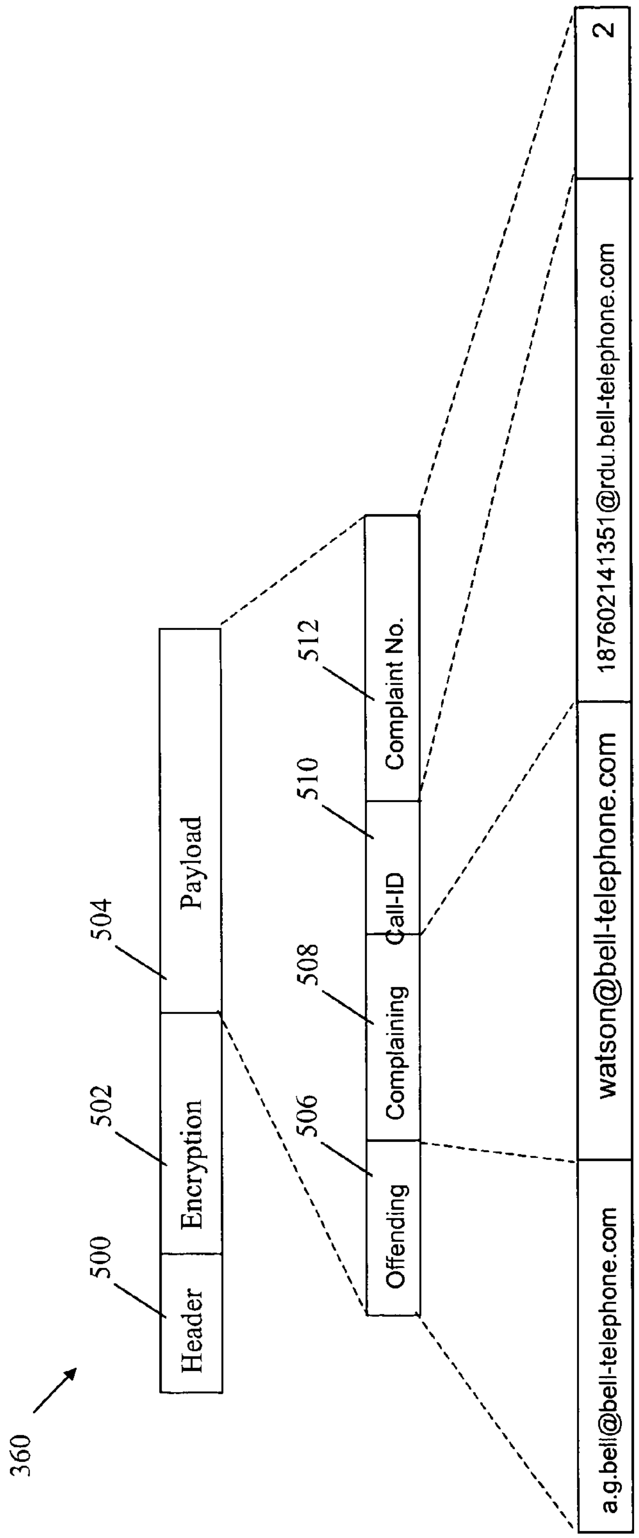
FIG. 9 is a diagram that illustrates an exemplary violation message structure according to an embodiment of the present invention.

FIG. 9 illustrates a sample violation message structure and associated sample content. Sample violation message 360 includes a message header component 500, which for the purposes of a SIP example, could include any required SIP header/packet information. Violation message 360 also includes an encryption field 502, and a violation payload field 504. Violation payload field 504 further includes an "Offending" field 506, a "Complaining" field 508, a "Call-ID" field 510, and a "Complaint Count" field 512. Again, it will be appreciated that the information contained in the violation payload field is relevant to determining and/or verifying the offending call, as well as the identity of the offending calling party. Other functionally equivalent violation message structures could easily be employed using a variety of application protocols to satisfy the desired objective of reporting a calling party harassment law violation without departing from the scope of the invention.

FIG. 10 illustrates one embodiment of complaint database 382. In this simplified example, database 382 is comprised of a several tables including a complaint table 400 and an enforcement table 420. Complaint table 400 employs a multi-field key structure that is comprised of an Offending Party ID field 402, a Complaining Party ID field 404, and a Call-ID field 406. Associated with each unique key is a Complaint Count field 408, and an Enforcement Agency (EA) ID pointer 410. Enforcement table 420 is keyed by a corresponding EA ID pointer 422, and associated with each unique EA key is an enforcement agency contact field 424. In one embodiment, the enforcement agency contact value is an e-mail address associated with a state attorney general's office.

Complaint Registration System Operation

Returning to FIG. 4, it will be appreciated that operation of the embodiment shown involves the creation and transmission of a call or communication setup message 270 by the calling party 112. For the purposes of example, it is assumed that the setup message 270 is a SIP Invite message. With particular regard to SIP based communication, it will be appreciated that a number of SIP signaling messages are actually employed in the establishment of a call or communication; however, for the purposes of illustration, only a SIP Invite message is considered herein. A more detailed treatment of SIP and the associated session description protocol (SDP) can be found in Internet Engineering Task Force (IETF) RFC 2543, SIP: Session Initiation Protocol, March 1999 and IETF RFC 2327, SDP: Session Description Protocol, April 1998, the disclosures of which are incorporated herein by reference in their entirety.

While receipt of the initial call setup signaling message by a called party terminal is significant in one embodiment of the present invention, the origin and routing history of the message may not be particularly relevant. Again, from FIGS. 4, 5 and 6 it will be appreciated that calling party 112 initiates a SIP Invite message 270 that is ultimately received by the called party terminal 250. Processing of the received SIP Invite message by called party terminal 250 depends on the call history associated with the calling party 112, as generally indicated in flow chart presented in FIG. 11.

Figure 11:
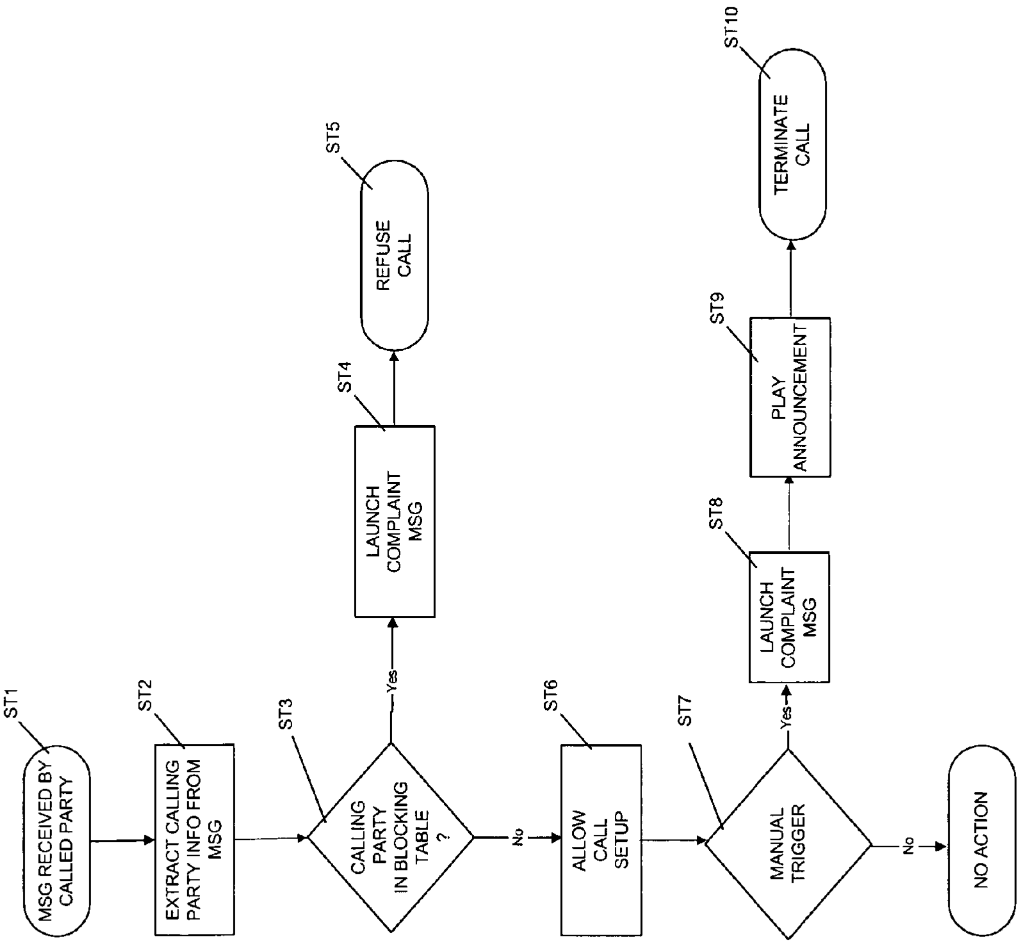
FIG. 11 is a flow chart illustrating message processing performed by an IP-capable called party communication terminal according to an embodiment of the present invention.

Referring to FIG. 11, once the SIP Invite message is received by the called party terminal (ST1), the current call information buffer 252 examines the message and extracts relevant information associated with the call, including information that completely or partially identifies the calling party (ST2). This information is compared against calling party entries stored in the "local" blocking table 260 that is maintained by the complaint registration application 254 (ST3). If a match is found in the "local" blocking table, which indicates that the calling party has previously committed an offending call, then setup of the call or communication is terminated (ST4) and the complaint message generator 258 is directed to create and launch a complaint registration message 300 (ST5). If a match is not found in the blocking table 260, then call or communication session setup is allowed to proceed to completion (ST6). If, while the call or communication is in progress, the called party user determines that the call is harassing or annoying, the called party user may elect to manually trigger a complaint registration (ST7). Again, such a manual trigger might be the pressing of a pre-programmed button on the communication terminal or the clicking of a pointing device associated with a computer. In any event, once the manual trigger has been initiated, the complaint message generator 258 is directed to create and launch a complaint registration message 300 (ST8). The recorded announcement buffer process 256 is also directed by complaint registration application 254 to play a pre-recorded announcement 282 to the offending calling party, thereby notifying the calling party that a complaint has been registered and that no further communication attempts should be made (ST9). The pre-recorded announcement may be an audio message or a text message depending upon the context of the attempted communication. For example, if a voice type communication attempt was being attempted by an offending calling party, an audio message could be played. If the offending calling party was attempting to send a text type short message or e-mail, a text announcement or notification message could be sent to the calling party in response. An example of such an announcement or text message may be, "You have been previously notified not to attempt communication with this party. A complaint has been registered against you." Once the pre-recorded announcement has been played or delivered to the offending calling party 112, the call or communication session is automatically terminated (ST10).

Figure 12:
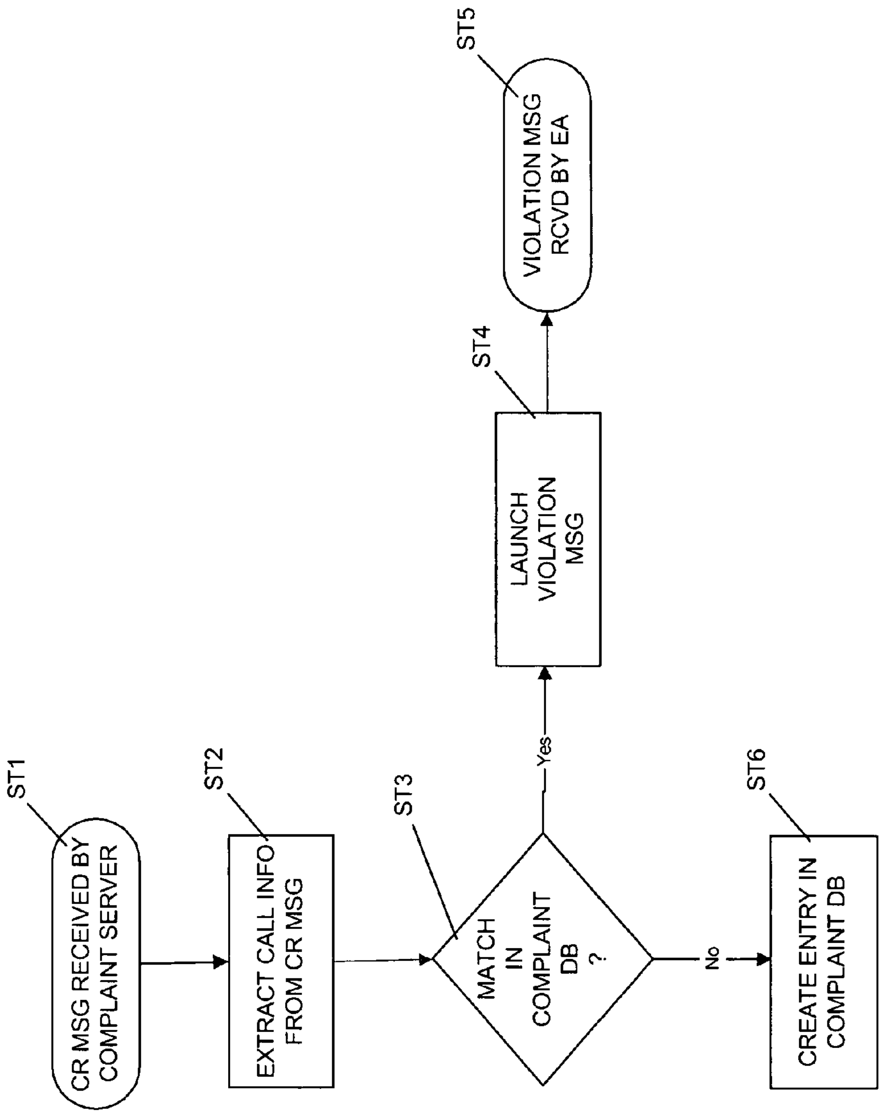
FIG. 12 is a flow chart illustrating complaint registration message processing performed by a complaint registration server according to an embodiment of the present invention.

As indicated in FIG. 4, the complaint registration (CR) message 300 formulated by the called party terminal 250 is transmitted via IP network 246 to complaint registration server 242. FIG. 12 illustrates the basic steps associated with processing of CR message 300 by the complaint registration server 242. Referring to FIG. 12, once the CR message 300 is received by the complaint registration server 242 (ST1), the complaint database manager process 380 examines the message and extracts relevant information associated with the offending call, including information that completely or partially identifies the calling party (ST2). Such information may include a calling party identifier, a called party identifier, and an identifier associated with offending call or communication. This information is compared against existing complaint entries stored in the complaint database 382 (ST3). If a match is found in the complaint database, indicating that a complaint has been previously registered against the calling party by the called party, then the violation message generator 384 is directed to create and launch a violation message 360 (ST4). The violation message is transmitted via IP network 246 to the appropriate enforcement agency (ST5), as determined during the complaint database lookup. The enforcement agency may use this violation message to document repeated legal infringements by a calling party, and take legal action as required. If a match is not found in the complaint database 382, then a new complaint database entry is created, based on information contained in the complaint registration message 300 (ST6).

Hybrid Complaint Registration System Embodiment

Figure 13:
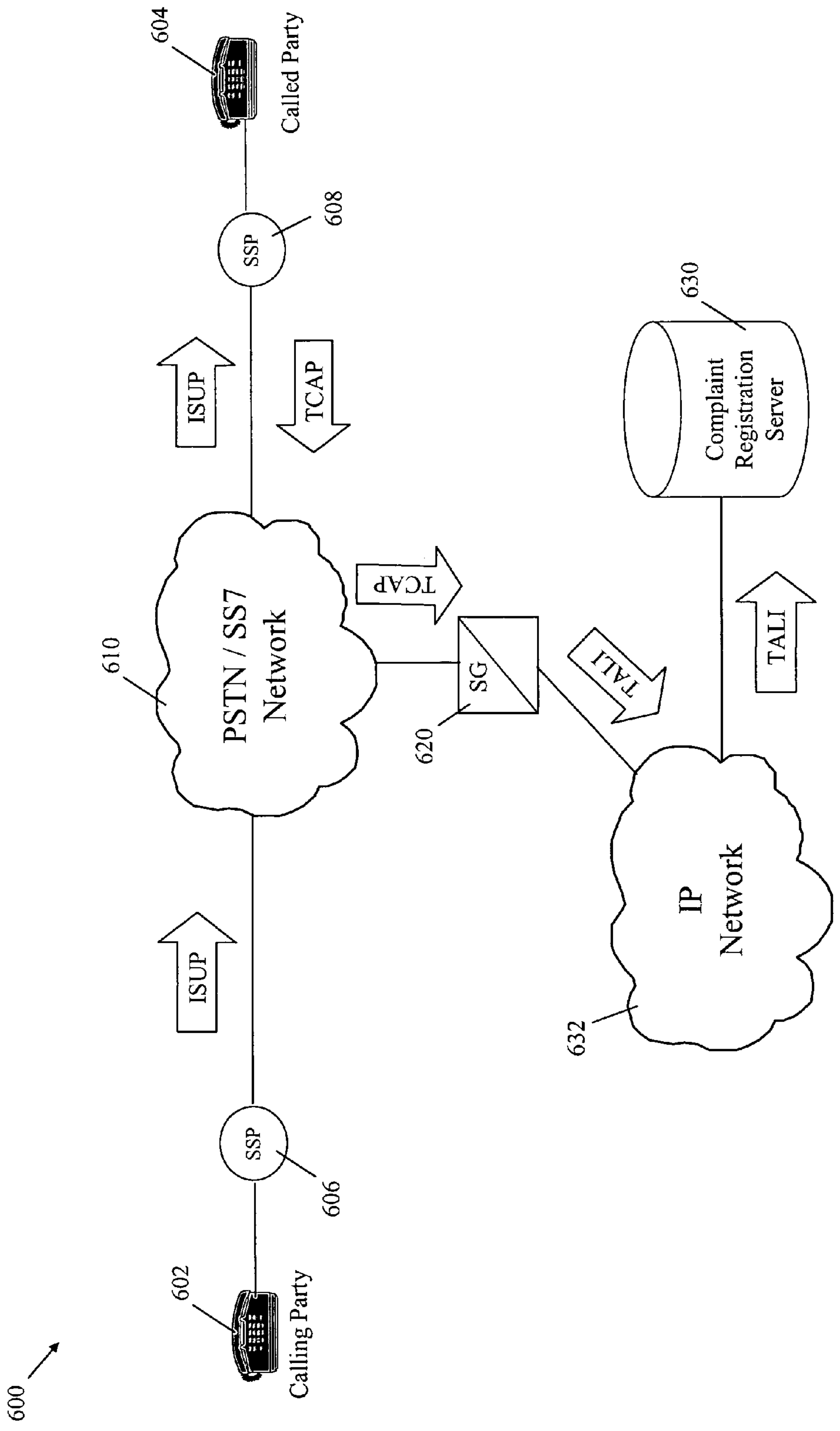
FIG. 13 is a network diagram illustrating complaint and violation message flow pathways through a converged SS7/IP communication network according to an embodiment of the present invention.

FIG. 13 illustrates a hybrid complaint registration system embodiment which is adapted to provide essentially same the complaint registration system functionality described above to conventional PSTN telephone service subscribers. More particularly, FIG. 13 is comprised of a hybrid or converged communication network 600 that includes a PSTN/SS7 signaling component 610 and an Internet protocol (IP) network component 632. Network 600 also includes a calling party terminal 602 and a called party terminal 604 which are connected to a pair of SS7 service switching points (SSPs) 606 and 608, respectively. SSP 606 and SSP 608 are adapted to communicate SS7 signaling messages via SS7 network 610. Signaling gateway (SG) 620 is adapted to receive an SS7 ISUP or TCAP signaling message from an SS7 signaling point (SP) within or connected to SS7 network 610 and to translate or convert the SS7 signaling message into a protocol format that is compatible with IP network 632 and nodes residing therein.

Of particular interest in this example is a complaint registration server node 630 that resides within or is connected to the IP network 632. Again, in this example, complaint registration server node 630 is adapted to send, receive and generally process messages that are formatted in a transport adapter layer interface (TALI) based protocol. Preferred packet formats for encapsulating various types of SS7 messages in IP packets are described in Internet Engineering Task Force (IETF) Internet Draft <draft-benedyk-sigtran-tali-01.txt>, June 2000, the disclosure of which is incorporated herein by reference in its entirety. Furthermore, an implementation of the transport adapter layer interface is described in commonly-assigned, co-pending U.S. patent application Ser. No. 09/588,852, the disclosure of which is incorporated herein by reference in its entirety. It will be appreciated that the concepts described in this disclosure are not dependent on the above referenced transport adapter layer interface signaling protocol. Other functionally similar signaling protocols may be employed within the scope of the present invention, including for example, the IETF SUA/M3UA protocol. The SS7 SCCP User Adaptation Layer is described in IETF internet draft <draft-sigtran-sua-03.txt, November, 2000, the disclosure of which is incorporated herein by reference in its entirety. The SS7 MTP3 User Adaptation Layer is described in IETF Internet Draft <draft-ieff-sigtran-m3ua-04.txt>, March 2000, the disclosure of which is incorporated herein by reference in its entirety.

Another protocol that may be utilized to communicated complaint registration and violation messages between network entities is the SCTP protocol, as described in RFC 2960, Stream Control Transmission Protocol, October 2000, the disclosure of which is incorporated herein by reference in its entirety.

In any event, it will be appreciated that in this embodiment of the present invention, signaling messages are not received or transmitted directly by the calling or called party telephones 602 and 604, respectively. Consequently, complaint registration message generation cannot be accomplished at the called party terminal 604. Instead, called party terminal 604 is adapted to notify or trigger SSP 608 to generate a complaint registration message on its behalf. It is known to provide similar SSP triggers by using touch tone key strokes, such as "*69." In this case, a called party user would be required to dial "*99," for instance, when a determination has been made that a particular call is harassing or annoying. Receipt of the "*99" trigger would induce SSP 608 to generate a transaction capabilities application part (TCAP) based complaint registration (CR) message, and transmit this message to SG 620. SG 620 upon receipt of the TCAP based CR message is adapted to translate the TCAP CR message into an equivalent TALI formatted CR message. Once this translation is accomplished, the resulting TALI CR message can be delivered to the IP network based complaint registration database 630. Processing of the TALI CR message at the complaint registration database 630 is identical to the CR message processing described above. In fact, a single complaint registration database could be implemented that would be adapted to service SIP, TALI, and any number of other CR message formats.

With regard to TALI and SG operation, a detailed description of a SG product which is marketed by the assignee of the present application as the 1P7 Secure Gateway, may be found in Tekelec publication PN/909-0767-01, Rev B, August 1999, titled Feature Notice IP$^7$ Secure Gateway™ Release 1.0, the disclosure of which is hereby incorporated by reference. The specific functional components of an IP$^7$ Secure Gateway™ for transmitting and receiving transaction capabilities application part (TCAP) messages over an Internet Protocol (IP) network are described in commonly-assigned, co-pending international patent publication number WO 00/35155, the disclosure of which is incorporated herein by reference in its entirety.

Returning to SSP 608, it will be appreciated that control logic within the SSP is adapted to maintain information that identifies the calling party 602 while a call is in progress. In response to a touch tone or similar type trigger initiated by a the called party 604, SSP 608 is further adapted to generate a complaint registration message using the same basic approach as described above and generally illustrated in FIG. 5. If SSP memory storage were available, a blocking table, similar to that described previously and illustrated in FIG. 6, could also be maintained for each telephone customer. In essence, the hybrid network embodiment described above simply moves the control and responsibility for complaint registration message generation into the core of the SS7 signaling network. Instead of the control and responsibility for complaint registration message generation residing in the end user communication terminals, as described initially, the hybrid embodiment requires the SSP that services a called party to generate a complaint registration message. However, in both embodiments, the end user controls when an initial complaint is registered.

Obscene Call Identification and Complaint Registration

Although the examples listed above are primarily directed to automatically generating complaint registration messages for callers that have been previously notified that communication is not desired, such as telemarketers, the present invention is not limited to such an embodiment. In an alternative embodiment, the present invention may include identifying obscene calls and generating complaint registration messages against obscene callers. For example, if a party receives a communication from an obscene caller, the party can push a button on the party's telephone to trigger a voice message tailored to obscene callers to be played, trigger a complaint registration message that identifies the call an obscene call, and terminate the call. Referring back to FIG. 4, complaint registration server 242 may distinguish between a complaint on a repeat caller such as a telemarketer versus a complaint for an obscene caller. Such distinction may be made by adding a field to complaint registration message 300 illustrated in FIG. 7 for identifying the call as an obscene call or a repeat violation call. Such a field may be included in the payload area of the complaint registration message.

In response to receiving a complaint registration message pertaining to an obscene call, complaint registration server 242 may immediately send a violation message to an enforcement authority without waiting for a repeat. Thus, the present invention can be used to identify and generate complaint registration messages and violation messages for obscene calls.

Although the embodiments listed above are primarily directed to SIP-initiated and SIP-terminated calls, the present invention is not limited to such embodiments. For example, the methods and systems for complaint message generation described above are applicable to PSTN-originated to SIP-terminated calls and vice versa.

In addition, the present invention is not limited to generating complaint registration messages for telephone calls. For example, a communication recipient may receive repeat communications, such as facsimile communications, email communications, short message service communications, etc., from parties who have been previously notified that communication is not desired. In response to receiving messages relating to these communications, the terminal equipment associated with the communication recipient may automatically generate complaint registration messages using the procedures described above. Thus, the present invention prevents harassment by facsimile, email, or other media, in addition to telephone calls.

It will be appreciated that various details of the invention may be changed without departing from the scope of the invention. Furthermore, the foregoing description is for the purpose of illustration only, and not for the purpose of limitation—the invention being defined by the claims.

What is claimed is:

1. A method for registering complaints against communication initiators, the method comprising:

(a) receiving a signaling message from a communication initiator relating to a communication from the communication initiator;

(b) extracting a calling party identifier from the signaling message and determining whether the communication is from a communication initiator with whom an intended communication recipient does not desire to communicate;

(c) determining whether the communication initiator has previously been notified not to initiate communications with the intended communication recipient;

(d) in response to determining that the communication is from a communication initiator with whom the intended communication recipient does not desire to communicate and that the communication initiator has been previously notified not to initiate communications with the intended communication recipient, automatically generating, from a user communications terminal or a service switching point (SSP), a complaint registration message identifying the communication initiator using the calling party identifier extracted from the signaling message and transmitting the complaint registration message over a data network;

wherein step (b) includes providing a complaint registration application comprising at least one of hardware and software for determining whether the communication is from a communication initiator with whom the intended communication recipient does not desire to communicate based on a trigger initiated by the intended communication recipient; and wherein step (d) includes providing a complaint message generator, the complaint message generator comprising at least one of hardware and software for generating the complaint registration message in response to the determination that the communication is from a communication initiator with whom the intended communication recipient does not desire to communicate and the determination that the communication initiator has been previously notified not to initiate communications with the intended communication recipient and for transmitting the complaint registration message over the data network.

2. The method of claim 1 wherein the communication comprises a short message service (SMS) message.

3. The method of claim 1 wherein the communication comprises a voice telephone call.

4. The method of claim 1 wherein the communication comprises a facsimile message.

5. The method of claim 1 wherein the calling party identifier extracted from the signaling message comprises a telephone number for the communication initiator.

6. The method of claim 1 wherein the signaling message comprises a mobile call signaling message and wherein the calling party identifier comprises a mobile identification number for the communication initiator.

7. The method of claim 1 comprising, in response to receiving the signaling message, notifying the communication initiator that no further communication with the intended communication recipient is to be attempted, wherein notifying the communication initiator that no further communication with the intended communication recipient is to be attempted includes providing a recorded message buffer comprising at least one of a hardware, software, and firmware for playing a pre-recorded message to the communication initiator that no further communication with the intended communication recipient is to be attempted.

8. The method of claim 7 including notifying the communication initiator that the complaint registration message is being sent to a complaint registration database.

9. The method of claim 1 wherein receiving a signaling message from a communication initiator includes receiving a session initiation protocol (SIP) message at a SIP phone.

10. The method of claim 9 wherein the SIP message comprises an Invite message.

11. The method of claim 10 wherein extracting a parameter from the signaling message includes extracting a parameter from the From field of the Invite message for identifying the communication initiator.

12. The method of claim 1 wherein receiving a signaling message includes receiving an IP telephony call signaling message.

13. The method of claim 1 wherein step G (d) is performed by the communications terminal.

14. The method of claim 1 wherein step (d) is performed by the SSP.

15. A method for automatically generating a complaint registration message in response to receiving a signaling message relating to a communication from a communication initiator with whom communication is not desired, the method comprising:

at a user communications terminal associated with a communication recipient:

(a) receiving a signaling message from a communication initiator relating to a communication from the initiator;

(b) determining, based on a calling party identifier in the signaling message, whether the communication initiator has previously been notified not to initiate communications with the communication recipient; and (c) in response to determining that the communication initiator has been previously notified not to initiate communications with the communication recipient, automatically generating, based on the signaling message, a complaint registration message including the calling party identifier and transmitting the complaint registration message over a data network;

wherein step (b) includes providing a blocking table listing calling party identifiers of communication initiators who have been previously notified not to initiate communications with the communication recipient and a complaint registration application comprising at least one of hardware and software residing on the user communications terminal for determining whether the communication initiator has been previously notified not to initiate communications with the communication recipient based on the presence of the calling party identifier in the blocking table; and wherein step (c) includes providing a complaint message generator comprising at least one of hardware and software residing on the user communications terminal for automatically generating the complaint registration message in response to the determination that the communication initiator has been previously notified not to initiate communications with the communication recipient and transmitting the complaint registration message over the data network.

16. The method of claim 15 comprising, at a complaint registration server, receiving the complaint registration message, performing a lookup in a complaint registration database using the identifying information from the complaint registration message to determine whether the communication initiator is a repeat offender.

17. The method of claim 16 comprising, at the complaint registration server, in response to determining that the communication initiator is a repeat offender, generating a violation message and transmitting the violation message to an enforcement authority.

18. The method of claim 16 wherein transmitting the complaint registration message over a data network includes sending the message to a complaint registration server storing previously-registered complaints indexed by at least one of called and calling party identifiers.

19. The method of claim 15 wherein receiving a signaling message at a communication recipient terminal includes receiving a session initiation protocol (SIP) message at a SIP phone.

20. The method of claim 19 wherein generating the complaint registration message comprises generating the complaint registration message at the SIP phone.

21. The method of claim 19 wherein the SIP message comprises an Invite message and the parameter is a calling party identifier in a From field of the Invite message.

22. The method of claim 15 wherein receiving a signaling message includes receiving an IP telephony call signaling message.

23. A system for registering a complaint against a communications initiator, the system comprising:

(a) a communications terminal adapted to receive communications and signaling messages associated with the communications from communications initiators, wherein the communications terminal is adapted to determine whether the communication is from a communications initiator with whom an intended communication recipient does not desire to communicate and whether the communications initiator has been previously notified not to initiate communications with the intended communication recipient, and wherein, in response to determining that the communication is from a communications initiator with whom an intended communication recipient does not desire to communicate and that the communications initiator has been previously notified not to initiate communications with the intended communication recipient, the communication terminal is adapted to generate and forward a complaint registration message over a data network, the complaint registration message including information extracted from one of the signaling messages for identifying the communications initiator; and (b) a complaint registration server operatively associated with the communications terminal for receiving and processing the complaint registration message;

wherein the communications terminal includes a complaint registration application comprising at least one of hardware and software for determining whether the communication is from a communications initiator with whom an intended communication recipient does not desire to communicate; and wherein the communication terminal further includes a complaint message generator comprising at least one of hardware and software for automatically generating the complaint registration message and forwarding the complaint registration message over the data network.

24. The system of claim 23 wherein the communication terminal comprises a session initiation protocol (SIP)-capable phone.

25. The system of claim 23 wherein the communications terminal comprises a personal computer.

26. The system of claim 23 wherein the complaint registration message is based on information contained in a calling party call setup signaling message.

27. The system of claim 23 wherein the complaint registration message comprises a SIP message.

28. The system of claim 23 wherein the complaint registration server is adapted to generate a violation notification message.

29. The system of claim 28 wherein the complaint registration server is adapted to send the violation notification message to a third party.

30. The system of claim 29 wherein the third party is a government agency.

31. The system of claim 23 wherein the complaint message generator is adapted to generate a complaint registration message in response to a trigger initiated by the intended communication recipient.

32. The system of claim 23 wherein the communications terminal includes a call blocking database that is adapted to store identification information related to a calling party that has been notified that communication with the intended communication recipient is not desired.

33. The system of claim 32 wherein the complaint message generator is adapted to generate the complaint registration message automatically in response to determining that an entry exists for the calling party in the call blocking database.

34. The system of claim 23 wherein the communications terminal comprises an IP telephony communications terminal.

35. The system of claim 23 wherein the complaint registration server is adapted to store previously registered complaints indexed by at least one of called and calling party identification information.

36. A method for automatically registering complaints against communication initiators, the method comprising:

(a) receiving a signaling message from a communication initiator relating to a communication from the communication initiator;

(b) extracting a calling party identifier from the signaling message and determining whether the communication is from a communication initiator with whom an intended communication recipient does not desire to communicate and whether the communication initiator has been previously notified not to initiate communications with the intended communication recipient; and (c) in response to determining that the communication is from a communication initiator with whom the intended communication recipient does not desire to communicate and that the communication initiator has been previously notified not to initiate communications with the intended communication recipient, automatically generating, from a user communications terminal or a service switching point (SSP), a complaint registration message identifying the communication initiator using the calling party identifier extracted from the signaling message and transmitting the complaint registration message over a data network;

wherein step (b) includes storing a blocking table including calling party identifiers identifying calling parties with whom the intended communication recipient does not desire to communicate and providing a complaint registration application comprising at least one of hardware and software for accessing the blocking table using the calling party identifier extracted from the signaling message to determine whether the communication is from a communication initiator with whom the intended communication recipient does not desire to communicate; and wherein step (c) includes providing a complaint message generator comprising at least one of hardware and software for generating the complaint registration message in response to the determination that the communication is from a communication initiator with whom the intended communication recipient does not desire to communicate and that the communication initiator has been previously notified not to initiate communications with the intended communication recipient, and for transmitting the complaint registration message over a data network.

* * * * *